(No Model.)

A. SEARLS.
TOP PROP FOR CARRIAGES.

No. 446,474. Patented Feb. 17, 1891.

WITNESSES:
C. W. Benjamin
Edith M. Stowbridge

INVENTOR
Anson Searls

United States Patent Office.

ANSON SEARLS, OF NEWARK, NEW JERSEY, ASSIGNOR TO THE SEARLS-RANDALL COMPANY, OF SAME PLACE.

TOP-PROP FOR CARRIAGES.

SPECIFICATION forming part of Letters Patent No. 446,474, dated February 17, 1891.

Application filed April 19, 1889. Serial No. 307,767. (No model.)

*To all whom it may concern:*

Be it known that I, ANSON SEARLS, a citizen of the United States, residing at Newark, in the county of Essex, State of New Jersey, have invented certain new and useful Improvements in Top-Props for Carriages; and I do hereby declare that the following is a full, clear, and exact description of the invention, which will enable others skilled in the art to which it appertains to make and use the same.

My invention relates to top-props for carriages; and it consists in a standard cast with tapering grooves, a washer held from vibration by prongs infringing firmly in said grooves, also in a collar provided with a slot and threaded only in the center, all as herein set forth.

Figure 1:
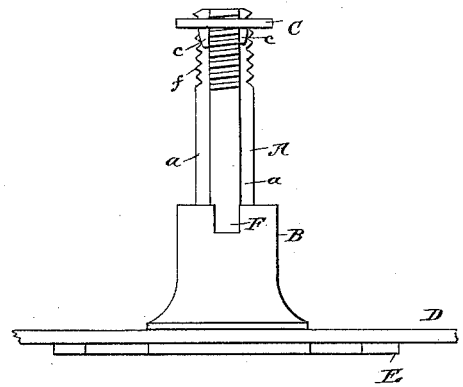
Figure 4:
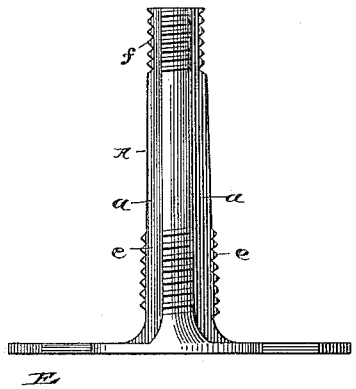
Figure 2:
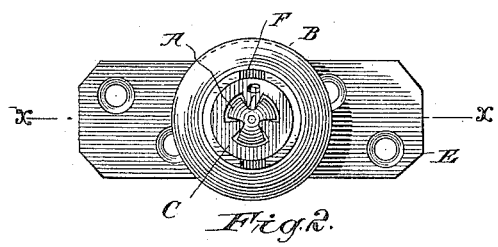
Figure 5:
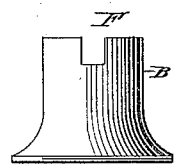
Figure 3:
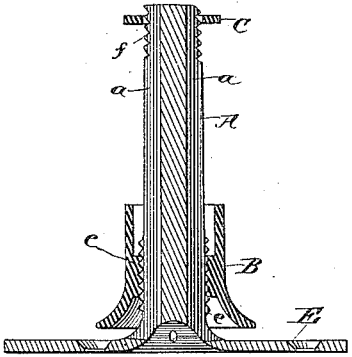
Figure 6:
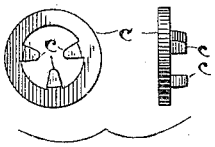

In the drawings herewith, Figure 1 is a view of the prop, showing the leather D between the collar B and base-plate E. Fig. 2 is a top view, and Fig. 3 is a section, of all the parts. Fig. 4 shows the standard A and plate E; Fig. 5, the collar B; and Fig. 6 is a view of the washer G.

The standard A tapers from base to point $f$, is cast with longitudinal grooves $a$, two or more, preferably three, and is threaded at the end $f$ to receive a prop-nut and near the base $e$ to receive a collar B. A washer G, provided with two or more prongs $c$, corresponding to the grooves $a$, slides on the standard, the prongs $c$ riding in and fitting firmly in the grooves $a$ and holding the washer clear of the thread $f$. (See Fig. 2.) These prongs $c$ start loosely in the grooves $a$, and owing to the taper of the standard A press on and fit the standard tighter the farther they are driven through groove $a$ by the nut or thread $f$, and are thereby held so firmly in the groove that the action of the prop-joint will not vibrate the washer and consequently loosen the nut.

By the use of a washer with two or more prongs $c$, as shown, it is held free from the thread $f$ without touching and marring it, while with only one prong so used the side opposite the prong must impinge upon the thread and work loosely when in place. Hence the nut is imperfectly shielded from the action of the prop-joint and in vibrating in any degree moves the nut, and thereby works it off by the repeated action of the joint, all of which is obviated by the grooves and washer, as above set forth.

By casting the standard with longitudinal grooves $a$, I make the standard A near the thickness of the plate E, thereby securing a uniform annealed quantity of iron in the standard A and plate E in place of the thick standard and thin plate heretofore in use, which, owing to the great difference in the thickness, cannot be uniformly annealed.

The collar B, usual in this style of top-props, is provided with a slot F to receive a wrench, by which it may be screwed up, and has a thread $e$ near its center to engage the thread $e$ on the standard A. By placing the thread near the center of the collar I am able to provide the slot F with a wrench where the thread has heretofore been located, and thereby screw the collar firmly to its place.

Having described my invention, I desire to secure by Letters Patent—

1. The combination of standard A, provided with two or more cast tapering grooves $a$, with the washer G, having corresponding prongs $c$, holding the washer free from the standard, as and for the purpose set forth.

2. The standard A and plate E, in combination with the collar B, having a center thread $e$, and slot F, as and for the purpose set forth.

3. The combination of a prop A and E with two or more longitudinal grooves $a$ cast therein, the washer G, with prongs $c$, and collar B, constructed with thread and slot, as and for the purpose set forth.

ANSON SEARLS.

Witnesses:
 FREDERICK WOODRUFF,
 SAML. J. SMITH.